(12) United States Patent
Cesarino

(10) Patent No.: US 8,235,332 B2
(45) Date of Patent: Aug. 7, 2012

(54) BRACKET FOR ATTACHING HOSES

(75) Inventor: Carlo Cesarino, Turin (IT)

(73) Assignee: Dytech—Dynamic Fluid Technologies S.p.A., Turin (IT)

( * ) Notice: Subject to any disclaimer, the term of this patent is extended or adjusted under 35 U.S.C. 154(b) by 0 days.

(21) Appl. No.: 12/844,976

(22) Filed: Jul. 28, 2010

(65) Prior Publication Data

US 2011/0024579 A1 Feb. 3, 2011

(30) Foreign Application Priority Data

Jul. 29, 2009 (IT) .............................. TO2009A0584

(51) Int. Cl.
*F16L 3/08* (2006.01)
(52) U.S. Cl. ........ 248/74.5; 248/65; 248/74.1; 248/74.4
(58) Field of Classification Search ................. 248/74.5, 248/74.1, 49, 65, 70, 59, 62; 174/92
See application file for complete search history.

(56) References Cited

U.S. PATENT DOCUMENTS

| | | | | |
|---|---|---|---|---|
| 2,338,006 | A | * | 12/1943 | Morehouse ................... 248/74.3 |
| 2,780,429 | A | * | 2/1957 | Vanier ............................... 248/59 |
| 4,407,479 | A | * | 10/1983 | Combe ........................... 248/59 |
| 4,441,677 | A | * | 4/1984 | Byerly ........................... 248/74.3 |
| 4,557,447 | A | * | 12/1985 | Combe ........................ 248/74.1 |
| 6,732,982 | B1 | | 5/2004 | Messinger |

FOREIGN PATENT DOCUMENTS

| | | |
|---|---|---|
| EP | 1039195 | 9/2000 |
| FR | 2640349 | 6/1990 |

\* cited by examiner

*Primary Examiner* — Amy J Sterling
(74) *Attorney, Agent, or Firm* — Gottlieb, Rackman & Reisman, P.C.

(57) ABSTRACT

A bracket for attaching a hose comprising a strip adapted to surround a hose, an end portion connected to the strip and a locking portion to close the strip about the hose, in which the locking portion is configured to cooperate with a threaded fastening device to fasten the bracket to a support is provided. The bracket further comprises at least one anti-rotation device adapted to cooperate with one of the threaded fastening device and the support.

9 Claims, 2 Drawing Sheets

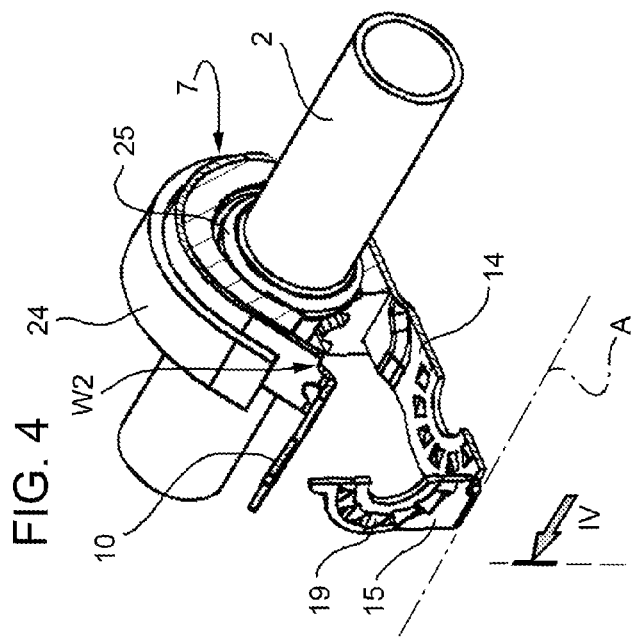
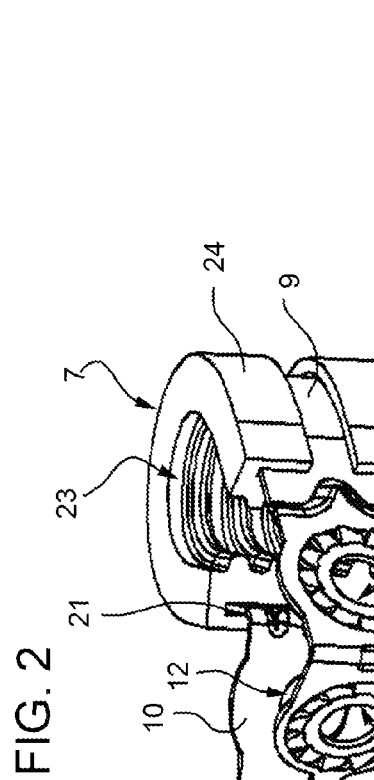
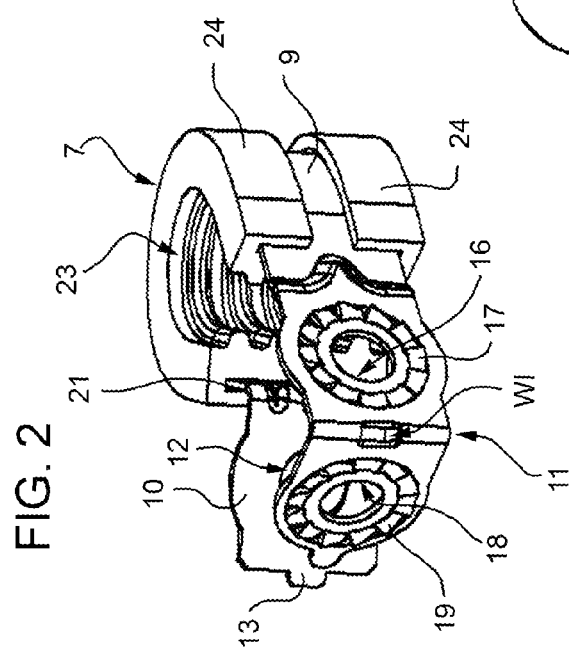

BRACKET FOR ATTACHING HOSES

The present invention relates to a bracket for attaching a hose of a fluidic system of a motor vehicle to a support, for example a flange plate or a portion of a chassis of the motor vehicle.

BACKGROUND OF THE INVENTION

A bracket for attaching a hose fastens a hose to an on-board fluidic system of a motor vehicle, such as for example an air-conditioning system, to avoid damages caused by dynamic stresses when the vehicle is moving and/or in contact with the abrasive and/or overheated surfaces which damage the wall of the hose and cause fluid to leak.

An essential requirement for a bracket for attaching a hose is a low production cost. In addition, it is preferable that the configuration of the bracket for attaching a hose facilitates the assembly by an operator during the assembly of the vehicle and at the same time ensures a firm and reliable fastening.

These requirements can be met if:
the above said bracket is locked on the hose and cannot accidentally detach;
the bracket has an appropriate interference with the hose so that it can be moved manually although not being free to move only by effect of its inertia;
the bracket can oppose its rotation with respect to the fastening screw or rivet during the assembly and during operation.

SUMMARY OF THE INVENTION

The object of the present invention is to obtain a bracket for attaching a hose that can meet at least partially the above mentioned requirements.

The object of the present invention is achieved by a bracket according to the attached claims.

BRIEF DESCRIPTION OF THE DRAWINGS

The invention will now be described with reference to the accompanying drawings, which illustrate non-limitative embodiments thereof, in which:

FIG. 2 is a perspective view that shows a portion adapted to come into contact with a flange plate of a chassis of a motor vehicle;

FIG. 3 is a perspective view of the bracket of FIG. 1 in an open configuration; and FIG. 4 is a section of FIG. 3 along plane P shown by arrows IV-IV in FIG. 3.

DETAILED DESCRIPTION OF THE INVENTION

Figure 1:
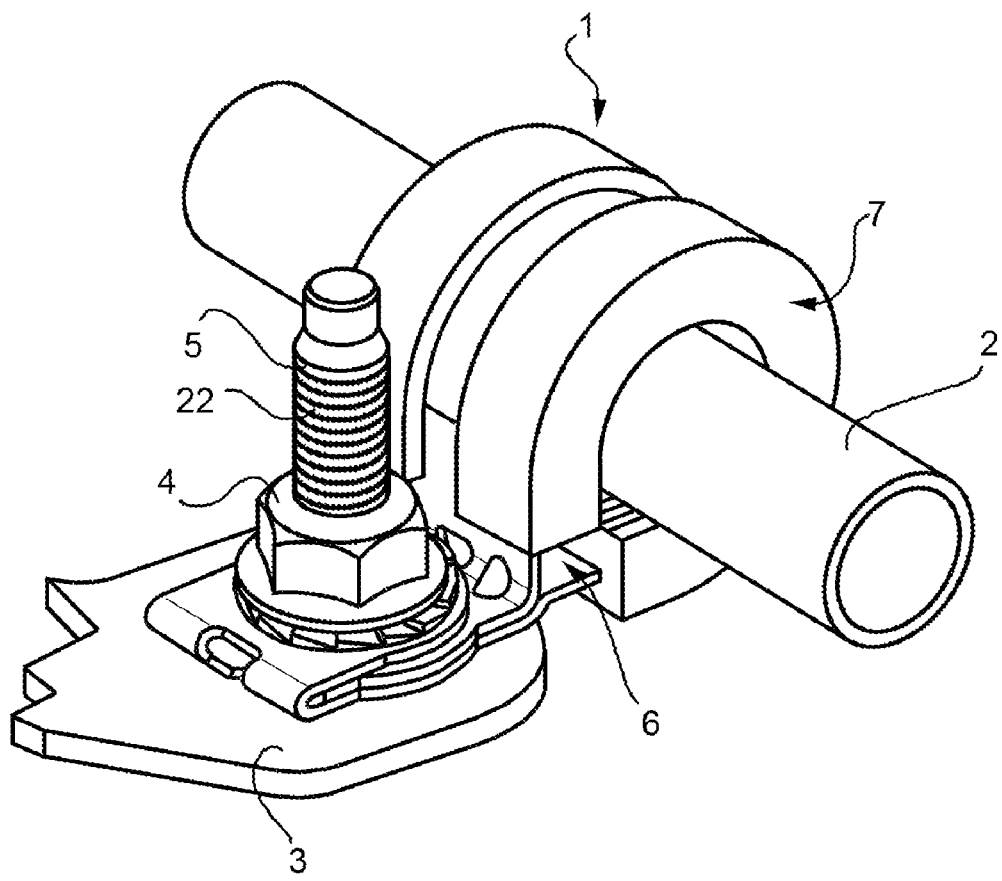
FIG. 1 is a perspective view of a bracket for fastening a hose according to the present invention.

In FIG. 1, 1 indicates a bracket for attaching a hose wound about a hose 2 of a fluidic system and fastened to a flange plate 3 projecting from a crossbar of the chassis of a vehicle or a heavy-goods vehicle.

Bracket 1 for attaching a hose is fastened to flange plate 3 by means of a threaded connection, for instance a nut 4 that engages a screw 5 fastened to flange plate 3.

Bracket 1 comprises a main body 6 preferably made in a single body from a metal strip, and an insert 7 made of a polymer material and fastened to main body 6. Insert 7 is preferably made of an elastomeric material and in use circumferentially surrounds at least partially a portion of hose 2.

Main body 6 comprises a strip 9 that supports insert 7 and surrounds hose 2, an end portion 10 transversal with respect to strip 9 when the latter is flat and undeformed and a locking portion 11 arranged opposite to the end portion 10 with respect to strip 9.

End portion 10 defines a through-hole 12 and a tooth 13 projecting in a radial direction with respect to an axis of through-hole 12 and substantially symmetrical with respect to a longitudinal symmetry plane P of main body 6.

On the opposite longitudinal part, locking portion 11 comprises a wall 14 defining a step 14a with strip 9 and a fin 15 foldable on wall 14. Wall 14 and fin 15 are connected by means of a plastic hinge having an axis A and substantially defined by two edges of metal which are deformed plastically when fin 15 is rotated to be overlapped to wall 14. The two edges of metal are spaced to define a through-window W1 adapted to cooperate with tooth 13 to position end portion 10 sideways and longitudinally with respect to wall 14.

Wall 14 defines a through-hole 16 having an axis perpendicular and skew with respect to axis A and an annular series of teeth 17 concentric to through-hole 16. Accordingly, fin 15 defines a through-hole 18 substantially concentrical to through-hole 16 when fin 15 is overlapped to wall 14, and an annular series of teeth 19 concentrical to through-hole 18.

Preferably, the annular series of teeth 17, 19 are made by plastic deformation of the metal plate, for example by pressing, and have a circumferential inclination direction, i.e. each tooth is twisted along an axis arranged radially with respect to the axis of through-hole 16, 18. Assuming that the screwing direction of nut 4 is clockwise, the teeth of series 17 are twisted to oppose loosening, i.e. are inclined so that the upper face of each tooth is inclined towards the following tooth in a anti-clockwise direction when the user looks at the surface of fin 15 that comes into contact with nut 4. The teeth of series 19 are inclined to oppose the rotation of bracket 1 while nut 4 is screwed during the fastening of hose 2 to flange plate 3. For this purpose, the teeth of series 19 are inclined clockwise, in an opposite direction i.e. with respect to what is specified above for teeth 17, when a user looks at a surface of wall 14 adapted to come into contact directly with flange plate 3.

Furthermore, fin 15 defines a tooth 20 radially projecting with respect to the axis of through-hole 18 and adapted to engage a window W2 defined along a joint 21 that joins strip 9 to end portion 10. Preferably, windows W1 and W2 are symmetrical with respect to the longitudinal symmetry plane P and the axes of through-holes 16, 18 are contained in this plane. Furthermore, joint 21 is parallel to axis A and both are perpendicular to the longitudinal symmetry plane P.

The assembly process of bracket 1 is as follows.

Hose 2 is surrounded by insert 8 and tooth 20 is housed in window W1 so that through-holes 12, 16 are substantially coaxial. Furthermore, step 14a is such that the thickness of end portion 10 is recovered and the middle plane thereof is substantially aligned to the middle plane of a flat portion of strip 9 adjacent to step 15.

Subsequently, fin 15 is folded towards hose 2 and through-hole 18 also results concentrical to through-holes 12, 16 to allow the assembly on a stem 22 of screw 5. In particular, tooth 20 engages window W2 and end portion 10 is interposed between wall 14 and fin 15. The bracket prepared thereby is fixed on hose 2 and can no longer detach for example when hose 2 is made by a sub-contractor and is sent to the plant where the assembly of the vehicle is carried out.

Finally, nut 4 is fastened by a clockwise rotation: teeth 19 bite on the flange plate 3 and teeth 17 do not oppose the tightening of nut 4 but bite to oppose loosening thereof, for example due to vibrations when the vehicle is moving.

On the basis of the above, the advantages that can be obtained by the bracket 1 for attaching a hose disclosed and shown herein are apparent.

The assembly is simplified because bracket 1 comprises an integral anti-loosening device, i.e. teeth 19. Furthermore, even during the fastening of bracket 1 to flange plate 3, teeth 29 avoid rotation so that hose 2 is not twisted.

Tooth 13 and window W1 temporarily fasten end portion 10 to wall 14 while the operator folds fin 15. Tooth 20 cooperates with window W2 to conveniently keep the bracket closed before inserting through-holes 12, 16, 18 on stem 22 and clamping nut 4.

It is finally apparent that bracket 1 for attaching a hose disclosed and shown herein may be modified or varied without departing from the scope of protection as specified in the appended claims.

For example, according to an embodiment, insert 8 is coupled to strip 9 by shape coupling, i.e. for example insert 8 has a working surface 23 adapted to oppose the hose and a pair of fins 24 arranged on the opposite side of working surface 23 with respect to strip 9 and facing the longitudinal symmetry plane P to define a seat. Strip 9 is housed in seat and kept in a radial direction by means of fins 24 which partially overlap strip 9.

Alternatively, insert 8 may be fixed with an adhesive to strip 9.

Furthermore, according to the present embodiment, hose 2 has an annular projection 25 that interferes with insert 7 so as to axially lock hose 2 with respect to bracket 1. In order to improve the locking of hose 2 along the direction of the axis of the hose, insert 5 defines a plurality of annular ribs and cavities 26, the latter defining respective seats for projection 25. Thereby, hose 2 is fastened by shape coupling to insert 7. Alternatively, hose 2 may be fixed to insert 7 by a simple friction action, i.e. hose 2 has a smooth surface.

Bracket 1 may comprise either only teeth 17 or only teeth 19, which singularly define an anti-rotation device respectively for nut 4 and for the bracket.

The invention claimed is:

1. A bracket for attaching a hose comprising a strip adapted to surround a hose, an end portion connected to said strip and a locking portion cooperating with said end portion for tightening said strip about the hose, characterized in that said locking portion is configured to cooperate with a threaded fastening device to fasten said bracket to a support and in that it comprises at least one anti-rotation device adapted to cooperate with one of said threaded fastening device and support and wherein said locking portion comprises a fin configured to be folded on said end portion by means of a plastic hinge.

2. The bracket according to claim 1, characterized in that said at least one anti-rotation device forms a single body with said locking portion.

3. The bracket according to claim 1, characterized in that said anti-rotation device comprises a plurality of teeth circularly arranged about an axis.

4. The bracket according to claim 1, characterized in that said strip, said end portion and said locking portion are made in a single body from a metal strip and are made by pressing.

5. The bracket according to claim 1, characterized in that said plastic hinge defines a window cooperating with a first tooth of said end portion.

6. The bracket according to claim 1, characterized in that said fin defines a second tooth adapted to cooperate with a second window for keeping said fin in a folded position over said end portion.

7. The bracket according to claim 1, characterized in that said locking device comprises a wall connected to said plastic hinge and in that said at least one anti-rotation device is arranged on either said fin or wall.

8. The bracket according to claim 3, characterized in that it comprises a second anti-rotation device configured to oppose a rotation in the opposite direction to that which is opposed by said at least one anti-rotation device.

9. The bracket according to claim 8, characterized in that said at least one anti-rotation device adapted to cooperate with said support is oriented to oppose the rotation of said bracket when the nut is screwed and in that said second anti-rotation device is oriented to oppose the loosening of the nut.

* * * * *